US009336651B2

(12) United States Patent
Owen et al.

(10) Patent No.: US 9,336,651 B2
(45) Date of Patent: May 10, 2016

(54) WAGERING GAME WITH ADVANCING TARGET ELIMINATION FEATURE

(71) Applicant: Multimedia Games, Inc., Austin, TX (US)

(72) Inventors: Clint Owen, Austin, TX (US); Brian Watkins, Austin, TX (US); Jason Kane, Austin, TX (US); Michael Casey, Austin, TX (US)

(73) Assignee: Everi Games, Inc., Austin, TX (US)

( * ) Notice: Subject to any disclaimer, the term of this patent is extended or adjusted under 35 U.S.C. 154(b) by 0 days.

(21) Appl. No.: 14/185,013

(22) Filed: Feb. 20, 2014

(65) Prior Publication Data

US 2015/0235519 A1 Aug. 20, 2015

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ........ *G07F 17/3244* (2013.01); *G07F 17/3262* (2013.01); *G07F 17/3267* (2013.01)

(58) Field of Classification Search

USPC .................. 463/16, 17, 18, 20, 25, 26, 27, 42

See application file for complete search history.

(56) References Cited

U.S. PATENT DOCUMENTS

| | | | | |
|---|---|---|---|---|
| 7,942,736 | B2 | 5/2011 | Mincey et al. | |
| 8,187,082 | B2 * | 5/2012 | Slomiany | 463/20 |
| 2003/0003987 | A1 * | 1/2003 | Estes | G07F 17/3211 463/20 |
| 2005/0059480 | A1 * | 3/2005 | Soukup et al. | 463/25 |
| 2007/0259713 | A1 * | 11/2007 | Fiden et al. | 463/25 |
| 2009/0082088 | A1 * | 3/2009 | Anderson et al. | 463/20 |
| 2013/0084965 | A1 * | 4/2013 | Gura et al. | 463/26 |
| 2013/0196751 | A1 * | 8/2013 | Simon | 463/26 |

* cited by examiner

*Primary Examiner* — Adetokunbo O Torimiro

(74) *Attorney, Agent, or Firm* — JP Cody; Nathan H. Calvert

(57) ABSTRACT

A wagering game is provided including an advancing target elimination game, which may be a base or bonus game. In this game, targets are shown to be advancing toward an objective, and the player is given selectable indicia with which to stop the targets. Each pick election may eliminate (or partially damage) a certain number and/or pattern of targets, with a credit value being awarded for each enemy eliminated. The bonus is played by taking turns between a phase of enemy target appearance and movement and a phase of player pick for enemy target elimination. These two phases alternate until an end-bonus condition is achieved.

19 Claims, 13 Drawing Sheets

20

1600

40

500

600

700

800

900

1000

1100

1200

Fig. 1M
Fig. 1N
TOTAL BONUS WON
23800
MINIMUM BET IS 50 CREDITS
CREDITS
9450
BET 500
23800
NURSE
SECURITY
ZOMBIE ESCAPE BONUS
Line Pay 50
23900 TOTAL CREDITS WON
MINIMUM BET IS 50 CREDITS
OUTBREAK
HELP PAYS
CREDITS
10537
BET PER LINE 10
BET 500
1087
CHANGE 1¢

1300

1500

WAGERING GAME WITH ADVANCING TARGET ELIMINATION FEATURE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all rights.

TECHNICAL FIELD OF THE INVENTION

The invention relates to gaming machines and systems, wherein the players participate in wagering games. More particularly, the invention relates to methods for conducting an interactive symbol array type wagering games in which selections eliminate targets.

BACKGROUND OF THE INVENTION

Various slot machine games use player selectable elements or other interactive features to enhance the game experience for games with reels, simulated reels, or other arrays of gaming symbols. Some games use player selection rounds including one or more player selections to increase excitement by providing extra opportunities for play along with an enhanced set of prizes. This is typically referred to as a player selection bonus round. Although player selection bonuses are relatively entertaining, they often feel repetitive to players. What is needed is a player selection bonus that provides more player interaction, leaving the player with a feeling of control.

SUMMARY OF THE INVENTION

The present invention includes a highly entertaining method of conducting a game for one or more players. The entertainment value is achieved partially by a reel symbol game including a player selection bonus game with selection pick feature in which advancing targets are eliminated. Generally, the bonus game proceeds as follows: there is a game play area resembling a game board of rows where the targets or enemies appear and move/progress across the board from an origin to an objective. There is a separate area of concealed pick indicia for the player to choose from. The result of each pick is to eliminate (or partially damage) a certain number and/or pattern of targets (enemies), a credit value (preferably from a random distribution) being awarded for each enemy eliminated. There may be different types of enemies with different capacities for damage and different credit-award distributions for elimination. The bonus is played by taking turns between a phase of enemy appearance and movement and a phase of player pick for enemy elimination. These two phases alternate until an end-bonus condition is achieved. Preferably, there are certain victory end conditions versus other defeat end conditions, with a victory end condition conferring an additional bonus result to the player. Preferably the defeat condition is any enemy or enemies reaching the finish location of the board. Preferably the victory condition is to eliminate all the enemies on the board, either by eliminating them faster than they can spawn, or in an alternate version the enemies may stop spawning at some point. In one embodiment the player pick locations replenish periodically to ensure that the player always has locations available to pick from in the player-pick phase. Alternatively, there might be an exhaustible set of pick locations, with running out of picks an alternate defeat condition (once the player runs out of picks the enemies proceed to advance to the finish unimpeded). The additional bonus for victory may be anything, for example—a simple credit award, pick(s) for credits, free spins, a wheel spin, or a multiplier applied to the total credits awarded from enemy eliminations in the bonus.

Another version of the invention is a computer program stored on a non-transitory readable medium. The software version is, of course, typically designed to be executed by a gaming machine or networked gaming system. The software includes multiple portions of computer executable code referred to as program code. Gaming results are provided in response to a wager and displayed by display program code that generates simulated slot reels, each including one or more symbol locations. The program also has game controller program code for determining game play results involving spins or other randomization of an array of symbols, and providing functionality of the selectable elements and enemy targets in the bonus round.

Another version of the invention is a gaming system that includes one or more gaming servers, and a group of electronic gaming machines connected to the servers by a network. The various functionality described herein may be distributed between the electronic gaming machines and the gaming servers in any practically functional way. For example, the current preferred architecture is for the servers to determine all aspects of game logic, random number generation, and prize awards. The gaming machines provide functionality of interfacing with the player and animating the game results to present the results received from the server in an entertaining manner. However, other embodiments of course might use a thin client architecture in which the animation is also conducted by the server and electronic gaming machines serve merely as a terminal to receive button or touchscreen input from the player and to display graphics received from the server.

Different features may be included in different versions of the invention. For example, different animation themes may be applied that display the application of the advancing target elimination bonus game board in different ways. Further, various types of enhancements may be revealed by the player selections that affect the bonus game logic and prizes. These and other advantages and features of the invention will be apparent from the following description of the preferred embodiments, considered along with the accompanying drawings.

DETAILED DESCRIPTION OF PREFERRED EMBODIMENTS

Figure 1A:
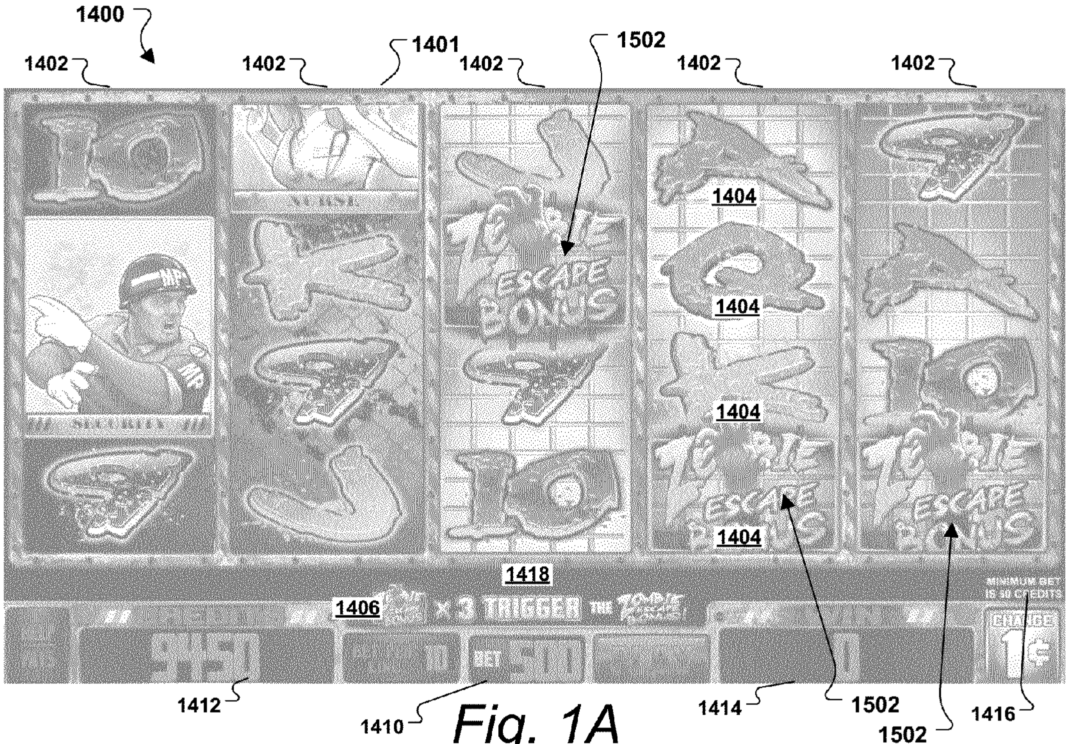
FIG. 1A is a representation of a graphic display of a base game screen example according to one embodiment of the invention.

FIG. 1A is an example game screen diagram showing a base game screen 1401 according to one embodiment. In this example embodiment, game screen 1400 has a matrix of symbol locations 1401. The matrix of symbol locations 1401 consists of five reels 1402, and each reel has four positions or symbol locations 1404. In this example, the player has already placed a wager, and started a wagering game. In this game screen 1401, three bonus round symbols 1502 have been revealed at three respective locations 1404. Referring to the other items in the depicted example screenshot, next to the matrix of symbol locations 1401 there is an area that has a prize feature explanation 1406. Under the prize feature explanation 1406 are found the current wager 1410, available credits 1412, and the payout or win meter 1414 for the current round. Along the bottom of the game screen 1400 there is a message line 1418, and a listing of the minimum wager 1416.

Figure 1B:
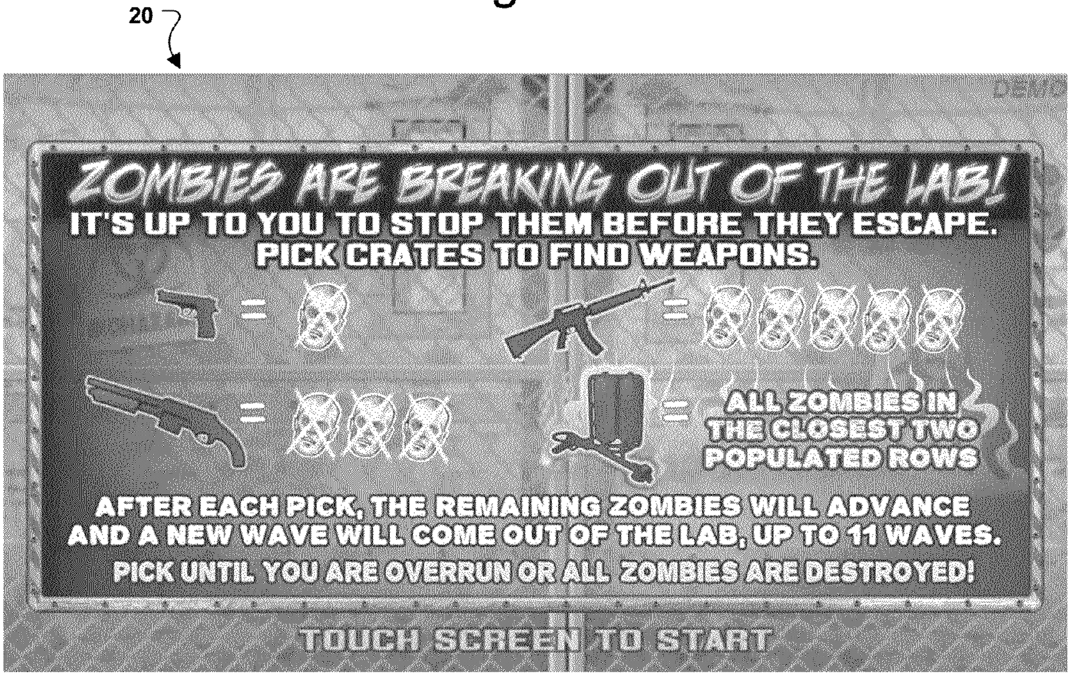
FIG. 1B is a representation of a graphic display of a start bonus game screen according to one embodiment of the invention.

FIG. 1B is a representation of a graphic display of a start bonus game screen 20 according to one embodiment of the invention. The depicted game screen 20 is shown after a bonus award scatter pattern such as that shown in FIG. 1A is reached, signaling the start of the bonus round and providing player instructions and information regarding the bonus round, which in this version is titled the "Zombie Escape" bonus round. While in this version the Zombie Escape game is presented as a bonus round, in other versions it could be employed as a base game or other type of secondary game.

FIGS. 1C-N are a sequence of bonus game screen representations showing the progress of an example complete bonus round according to one embodiment. The basic functioning of the bonus game screen will now be described with regard to FIG. 1C, and then the conduct and logic of the bonus game will be described with respect to all of the game screens 1C-N and the flowchart of FIG. 2B.

Figure 1C:
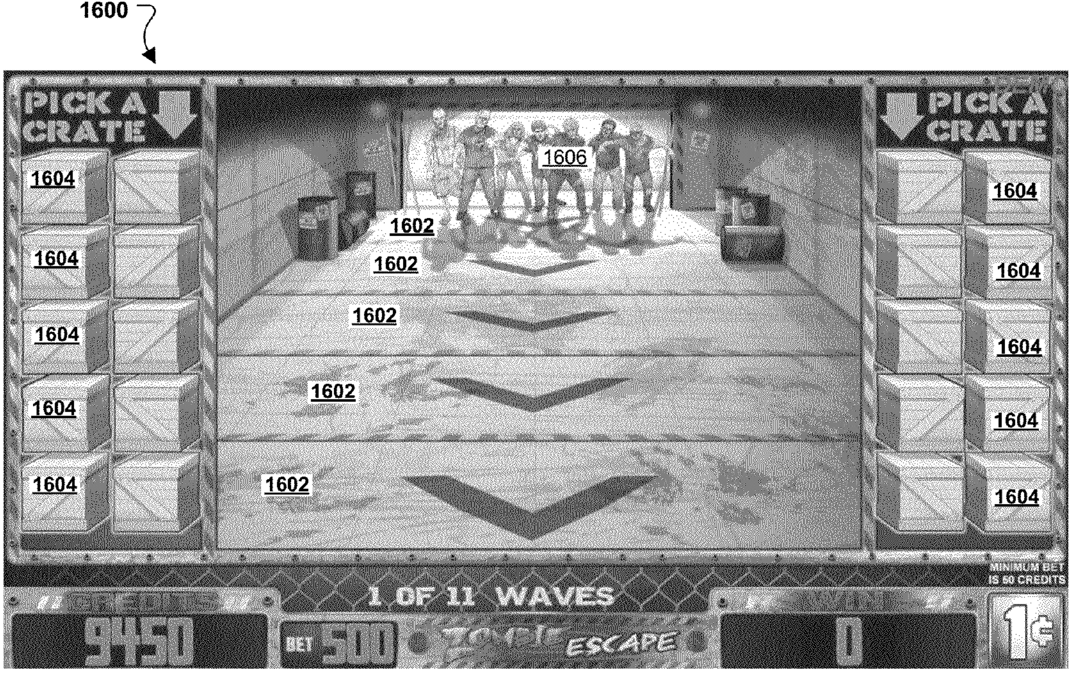
FIGS. 1C-N are a sequence of bonus game screen representations showing the progress of an example complete bonus round according to one embodiment.

FIG. 1C shows a bonus game screen 1600 according to one embodiment of the invention. This bonus screen is displayed when a bonus round has started. The central area of the display includes a plurality of ranks or rows 1602, along which enemies or targets advance in the game. In this game theme, the targets 1606 are zombies, which are trying to escape the lab behind them as explained in the description in FIG. 1B. Targets 1606 advance along rows 1602, preferably advancing one row per round of the game. The player selects indicia 1604, which in this version are crates containing weapons to be used in each round of the bonus game. Preferably the selection is made on a touchscreen game display, but other versions may provide other selection methods. When selections are made, the indicia 1604 reveals a graphic of the previously concealed weapon, and the central display area is animated to display the weapon being used to attack the targets 1606 and the resulting effect. Along the bottom of the display is an indicator of the current "wave" or round of targets being released.

Figure 2A:
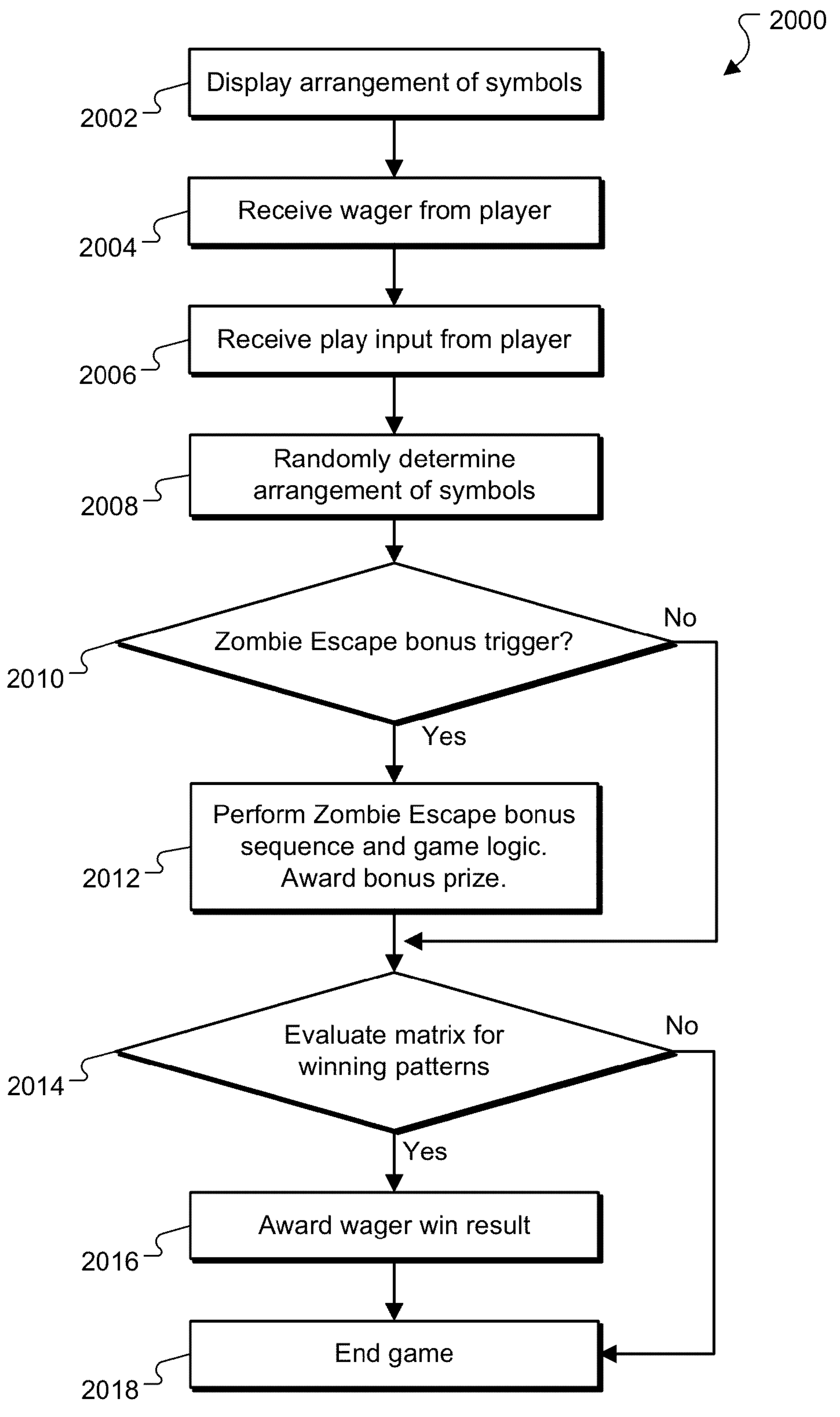
FIG. 2A is a flowchart showing an example of the general game play process at a gaming machine that includes the Zombie Escape bonus sequence.

FIG. 2A is a flowchart of a game play in an example embodiment of the base game, for example the game shown in FIG. 1A. This flowchart 2000 includes a trigger of the advancing target elimination bonus game, which in this version is the Zombie Escape bonus (flowchart of FIG. 2B). The process starts in step 2002 where the game displays an arrangement of symbols on the game screen. Next, the process in step 2004 receives a wager from the player, and then receives a play input from the player in step 2006.

After receiving the play input in step 2006, the process then in step 2008 randomly determines the symbol content of the reels (matrix of symbol locations) and populates them with the selected symbols to display the game result. Although in this embodiment, the process only now determines the content of the reels, in other possible embodiments, the content of the reels may be determined at different steps. For example, a Class II type system employing pre-generated or reverse-mapped outcomes may be used, and the contents of the game may be generated in advance.

Next, at step 2010, the process evaluates the contents for the presence of a trigger scatter pattern triggering the advancing target bonus round, which in this embodiment is referred to as the Zombie Escape bonus (for example, the pattern shown in FIG. 1A). If the relevant bonus trigger is found, then the process moves to step 2012 and performs the Zombie Escape bonus sequence and game logic. After the Zombie Escape bonus sequence, the process then goes to step 2014 where it evaluates the reels for any winning patterns. If in step 2010 the process does not activate the Zombie Escape bonus, then the process goes directly to step 2014 to evaluate the reels for winning patterns. (Other bonus triggers may be present as well and evaluated at step 2010.) If there are winning patterns, then the process awards them in step 2016 before ending the game in step 2018. If there are no winning patterns, the process ends the game in step 2018.

Figure 1D:
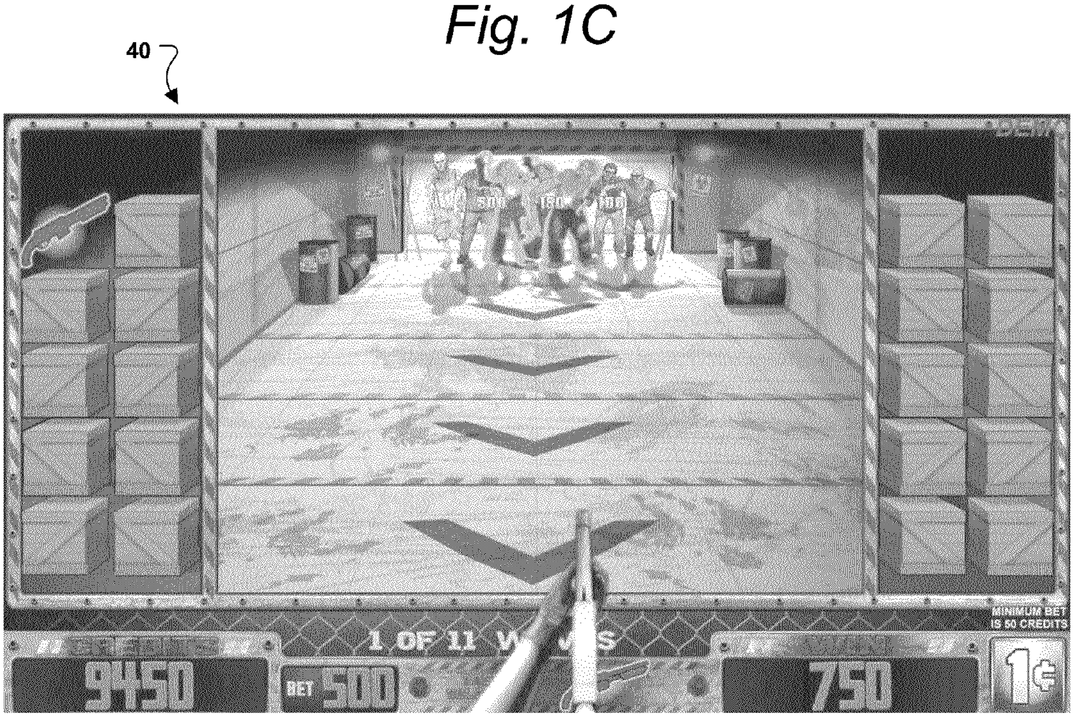
Figure 1E:
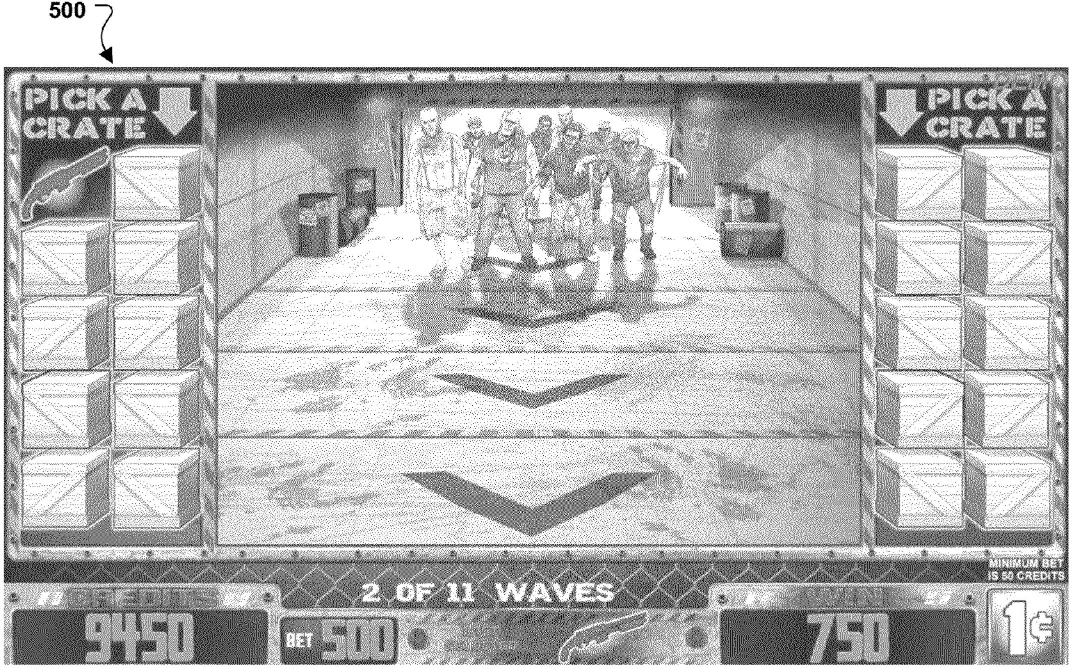
Figure 1F:
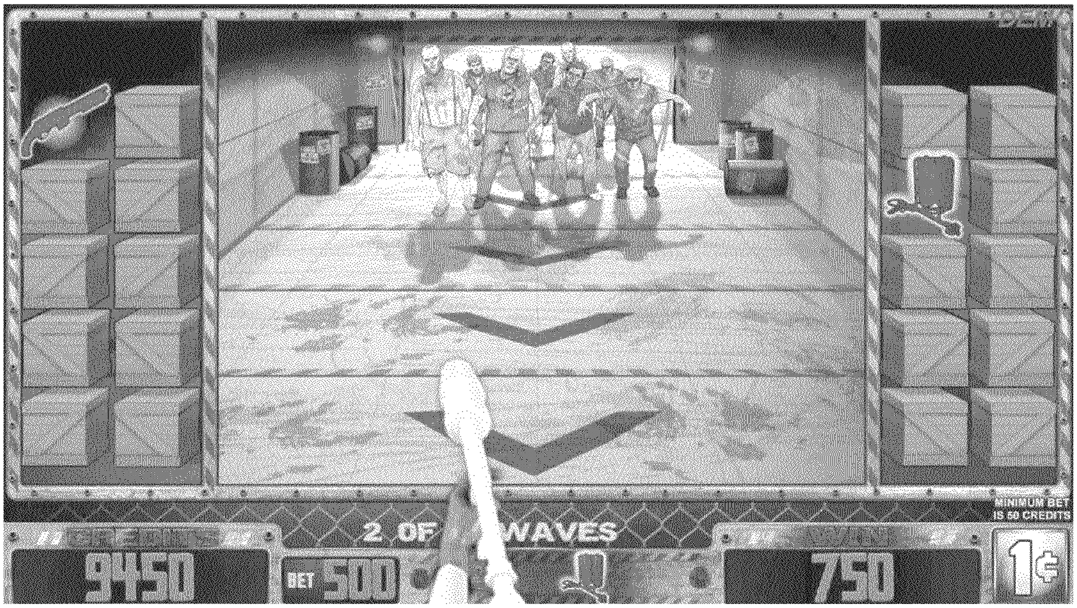
Figure 1G:
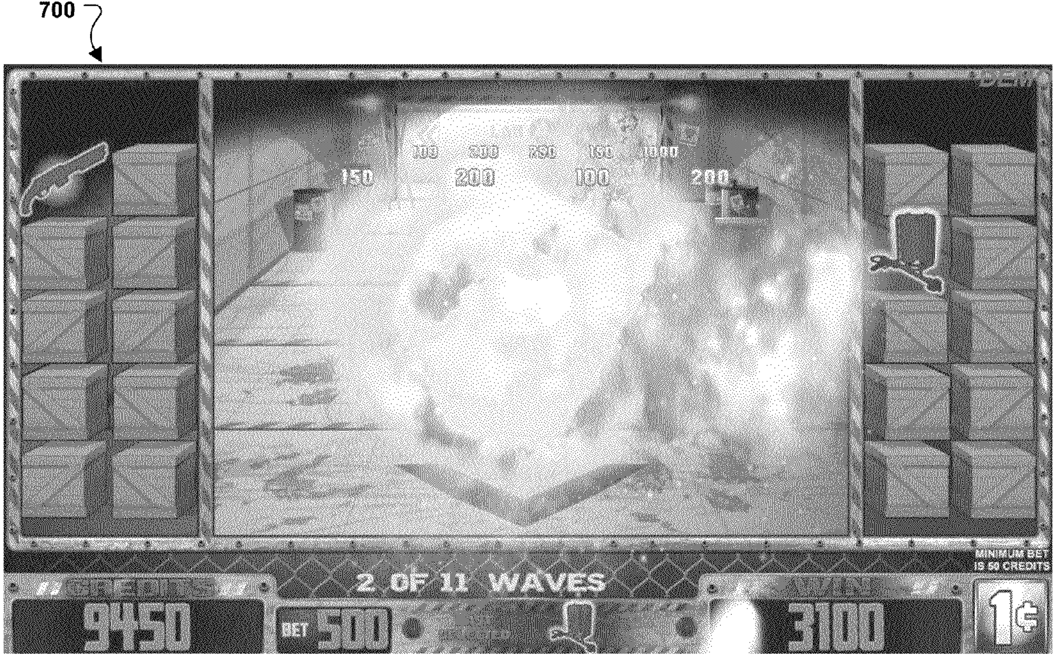
Figure 1H:
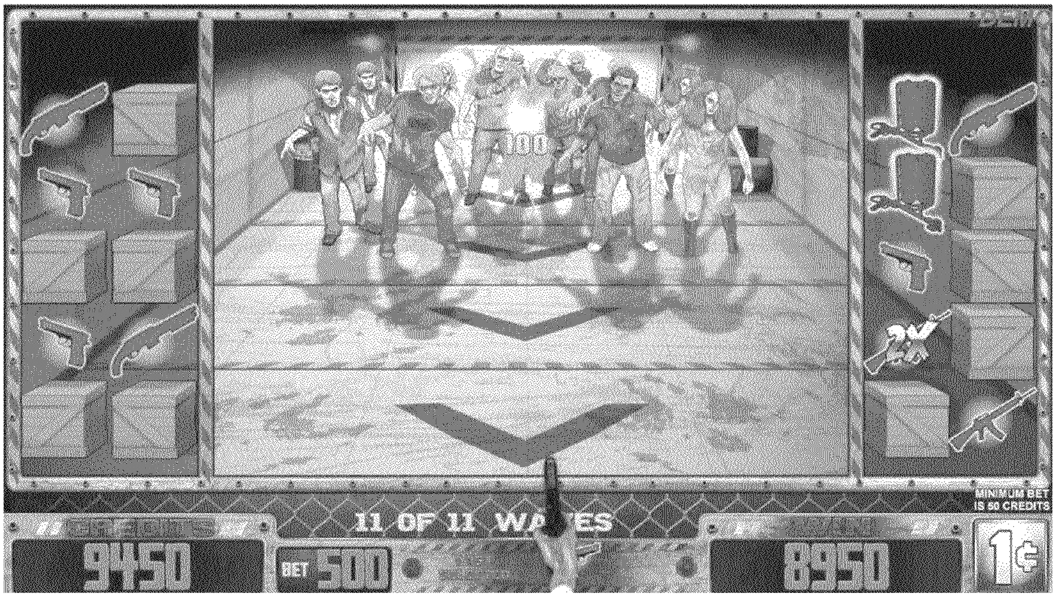
Figure 1I:
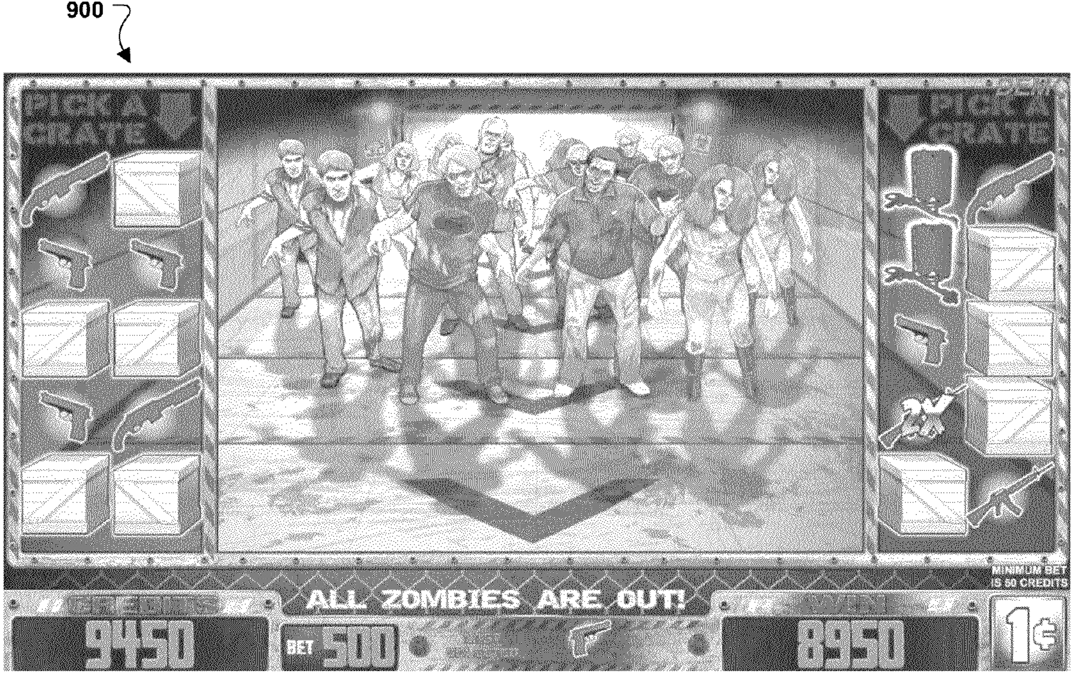
Figure 1J:
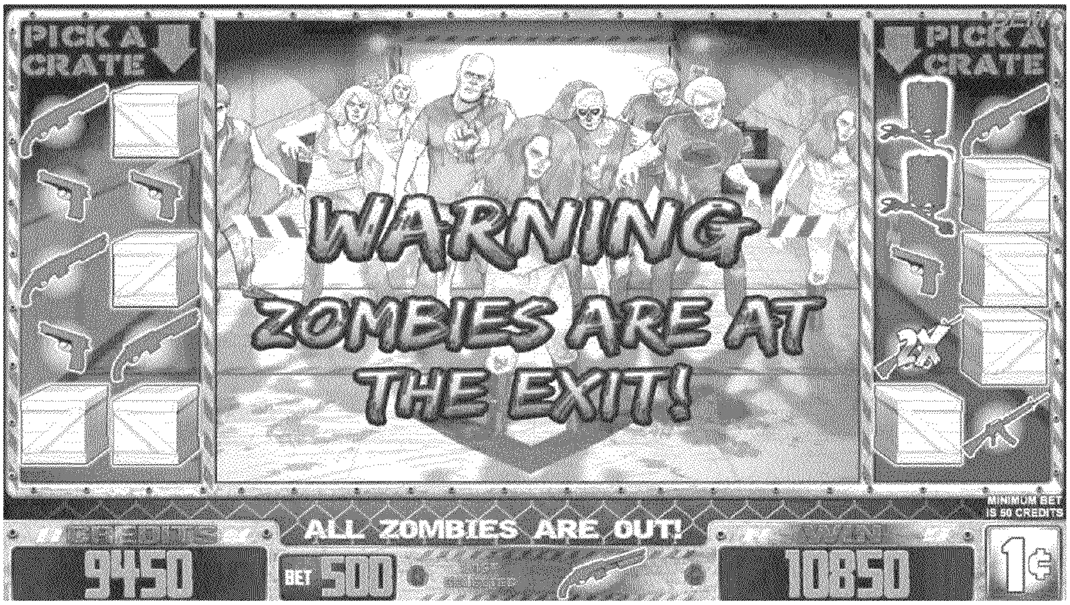
Figure 1K:
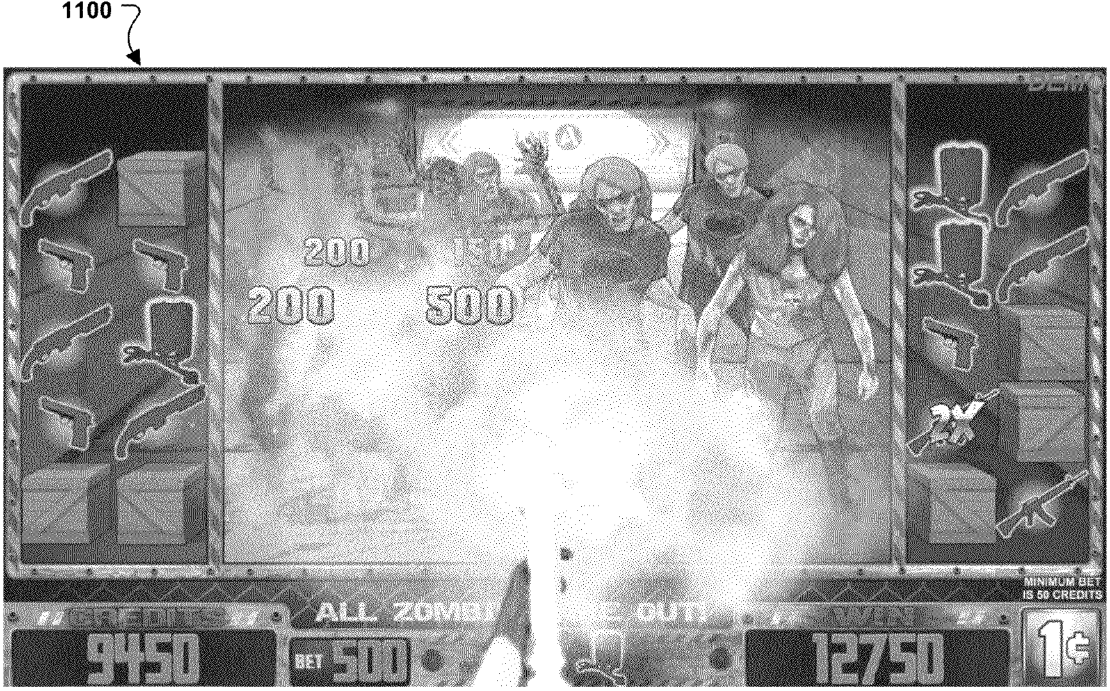
Figure 1L:
Figure 1M:
Figure 1N:
Figure 2B:
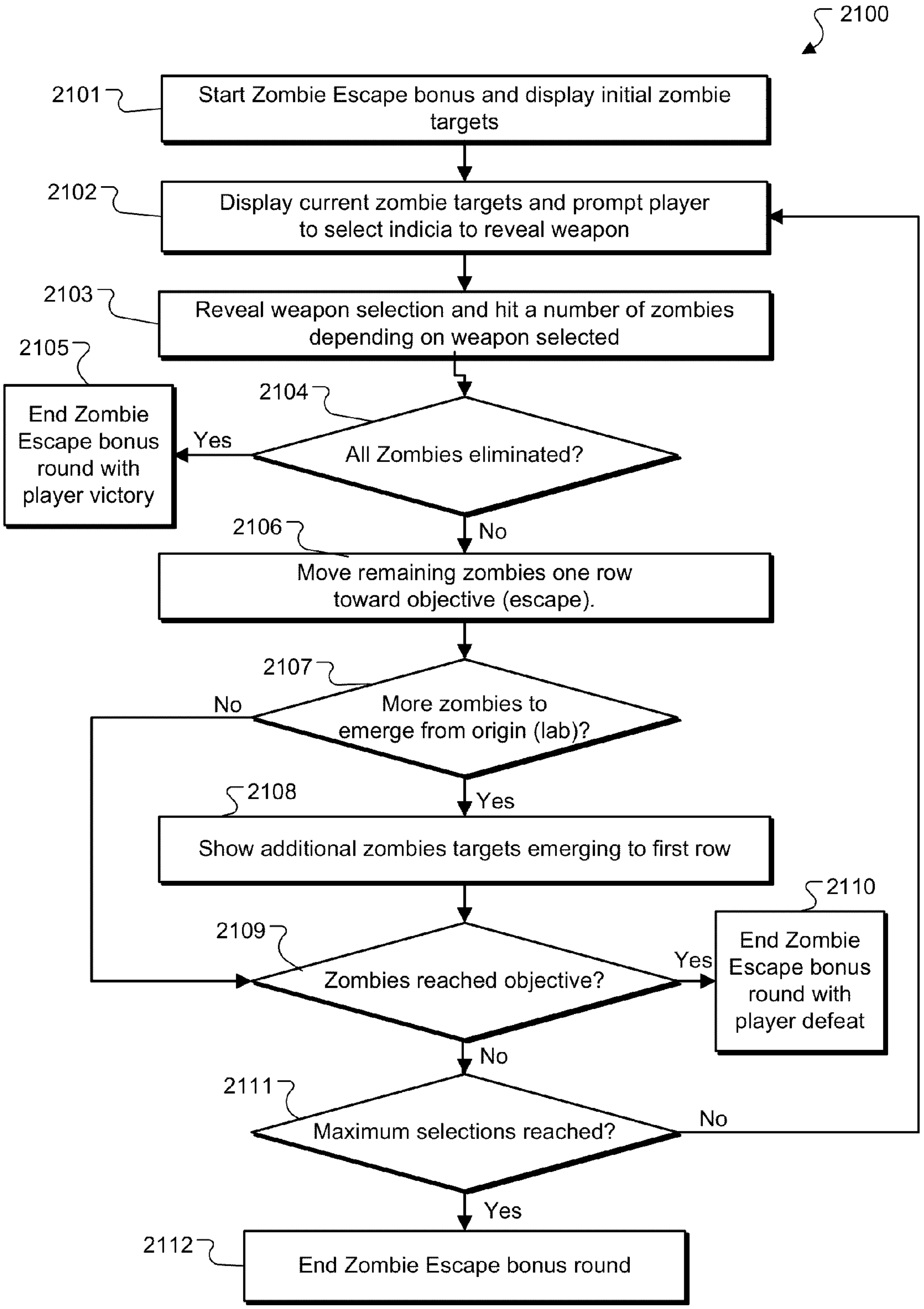
FIG. 2B is a flowchart showing an example of the Zombie Escape bonus round logic according to one embodiment of the invention.

FIG. 2B is a flowchart showing an example embodiment of the target elimination bonus logic, in this embodiment a Zombie Escape theme bonus game. The conduct of the player selection bonus round will now be described with regard to FIGS. 1B-N and FIG. 2B. In this embodiment, the process starts as shown in flow chart 2100 at step 2101 where the Zombie Escape bonus game has already been activated. Generally, the bonus game proceeds as follows: there is a game play area resembling a game board (FIG. 1C) of rows 1602 where the targets or enemies 1606 appear and move/progress across the board from an origin to an objective, which occurs at steps 2101-2102 and is shown in an example game screen at FIG. 1C. The view in FIG. 1C is from the point of view of the objective, with the arrows along the board or "floor" showing the direction of movement from the origin (the lab door) to the objective (in this version, the exterior door where the zombies escape). The player in this version is in the role of a soldier or other human guarding the door trying to prevent the zombie escape. There is a separate area of concealed pick indicia 1604 for the player to choose or pick from, with the pick being prompted at step 2102. Next, the result of each pick at step 2103 is to reveal a play element such as a weapon, which is applied in the game to hit targets and thereby eliminate (or partially damage) a certain number and/or pattern of targets (enemies) 1606. Different types of weapon elements are available to be revealed with differing effects as listed for this version in FIG. 1B. For example, the effect of a shotgun element being picked is shown in FIG. 1D, and a flamethrower element is shown being applied in FIGS. 1F-G. A credit value (preferably from a random distribution) is awarded for each enemy eliminated, such as, for example, the credit values shown superimposed over the zombie targets hit by the shotgun element being applied in FIG. 1D. There may be different types of enemies (zombies in this version) with different capacities for damage and different credit-award distributions for elimination.

The bonus is played by taking turns between a phase of enemy appearance and movement and a phase of player pick for enemy elimination. These two phases alternate until an end-bonus condition is achieved. The zombie target movement phase first occurs at step 2101 where the very first round of zombies moves out of the lab. After each time the player is given a chance to pick a weapon element and eliminate zombies in steps 2102-2105, the movement phase occurs again at steps 2106-2109. Preferably, there are certain victory end conditions versus other defeat end conditions, with a victory end condition conferring an additional bonus result to the player. In this version the victory end condition is reached at step 2105 if all zombies are eliminated at step 2104, which is shown at FIGS. 1K-1L as a flamethrower weapon element is revealed and used to eliminate all the zombie targets to provide an additional 10,000 credits. The additional bonus for victory may be anything, for example—a simple credit award, pick(s) for credits, free spins, a wheel spin, or a multiplier applied to the total credits awarded from enemy eliminations in the bonus.

Preferably the defeat condition is any enemy or enemies reaching the finish location of the board, shown at step 2110 if the zombie targets have reached the objective at step 2109. In this version, a warning is given if the zombie targets reach the final row 1602 before the objective, as shown in FIG. 1J where at zombie target is in the closest row to the exit (the bottom of the game board on this display) and the warning is shown on the screen. At this point, if the next player pick does not reveal a strong enough weapon element to eliminate all the zombies in that row, zombies will reach the exit in their following movement phase and the player will be defeated. Points achieved before defeat may still be awarded. Preferably the victory condition is to eliminate all the enemies on the board, either by eliminating them faster than they can spawn or emerge from the lab, or in an alternate version the enemies may stop spawning at some point. In this version, at step 2107 the process checks if there are more zombies to emerge from the lab, and if so shows more zombies spawning or emerging onto the first row of the board at step 2108. This can be seen in FIG. 1E, for example, in which the 2$^{nd}$ wave of zombies appears behind the survivors of the first group when the zombies move forward (steps 2106-2108). It is noted that in this embodiment, the enemy targets are only allowed to emerge for 11 waves or rounds as shown by the text prompt below the game board at each round ("2 OF 11 WAVES" in FIG. 1E). Once all targets have emerged, the prompt at the bottom of the game board changes to notify the player of this development, such as the message "ALL ZOMBIES ARE OUT!" shown in FIG. 1L. Other embodiments may continuously release more enemy targets, or provide one or more rounds in which no targets emerge followed by rounds in which additional targets emerge.

In one embodiment the player pick indicia 1604 replenish periodically to ensure that the player always has locations 1604 available to pick from in the player-pick phase. In some versions the rounds continue until a victory or defeat condition is reached. Alternatively, there might be an exhaustible set of pick locations 1604 such as the process decision at step 2111, with running out of picks an alternate defeat condition at step 2112 (once the player runs out of picks the enemies proceed to advance to the finish unimpeded). The picks may also have enhancement features associated with whatever weapon is revealed by the player pick, as seen in FIG. 1H where a machine gun pick is shown on the right with a "2×" multiplier on it, meaning that all targets eliminated by the machine gun in that round are given double there typical points.

After the bonus round ends in any manner (victory at step 2105, defeat at step 2110, or running out of picks at step 2112), a Total Bonus Screen will appear over the game board displaying the credits won. Then the Total Bonus Screen will clear back to the base game, which is seen in FIG. 2A at step 2014 where the Zombie Escape bonus is completed. As the bonus round exits, the bonus credits will count up in the win meter. In jurisdictions that require prize claiming (some class II), the credits, once claimed, will snap into the Credits meter. Next the base game evaluates the matrix for winning patterns, and the Zombie Escape Bonus symbols will animate and the payline will display the total bonus amount won at steps 2014-2016.

Figure 3A:
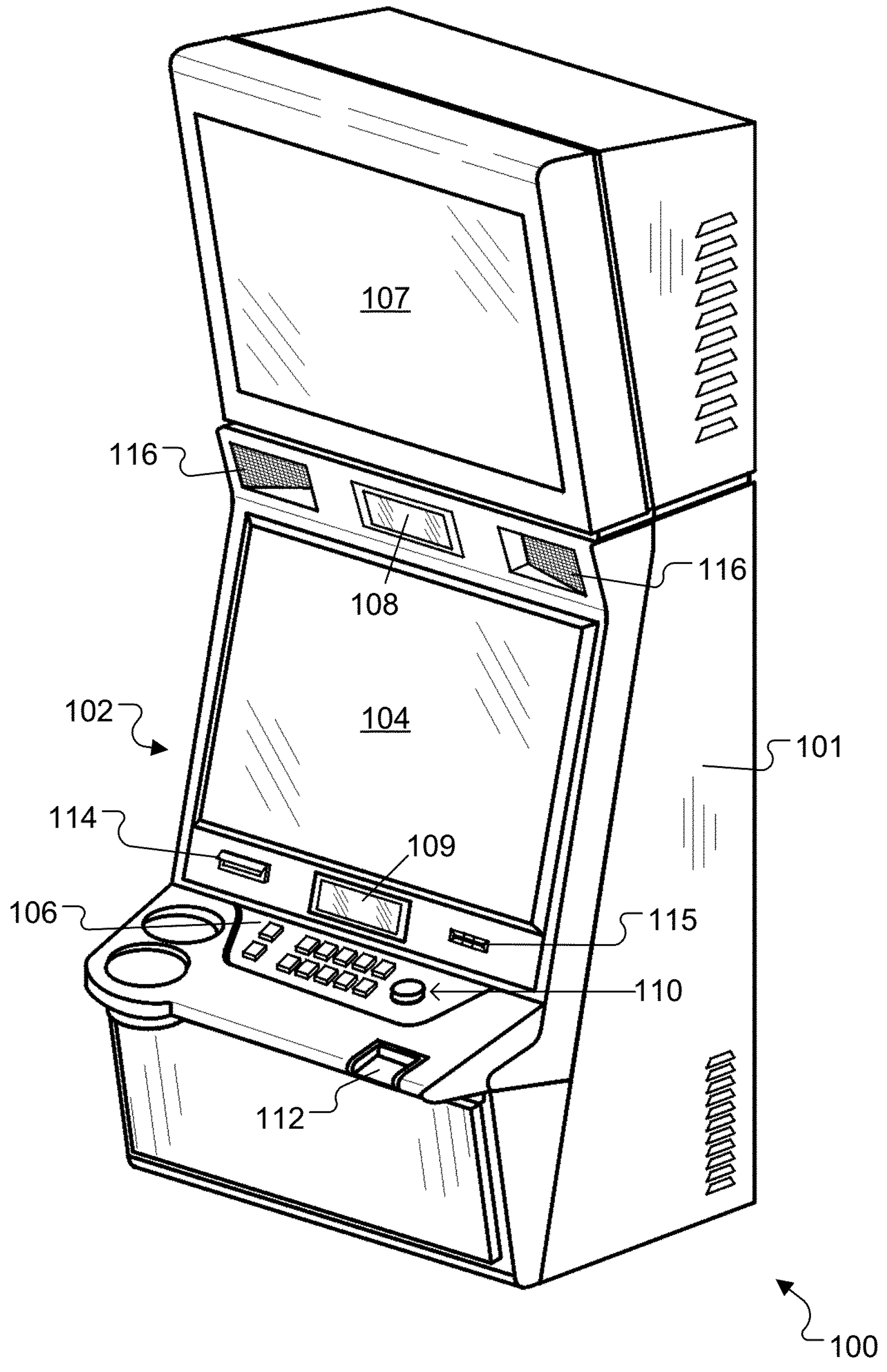
FIG. 3A is a front perspective view of a gaming machine which may be used in a gaming system embodying the principles of the present invention.
Figure 3B:
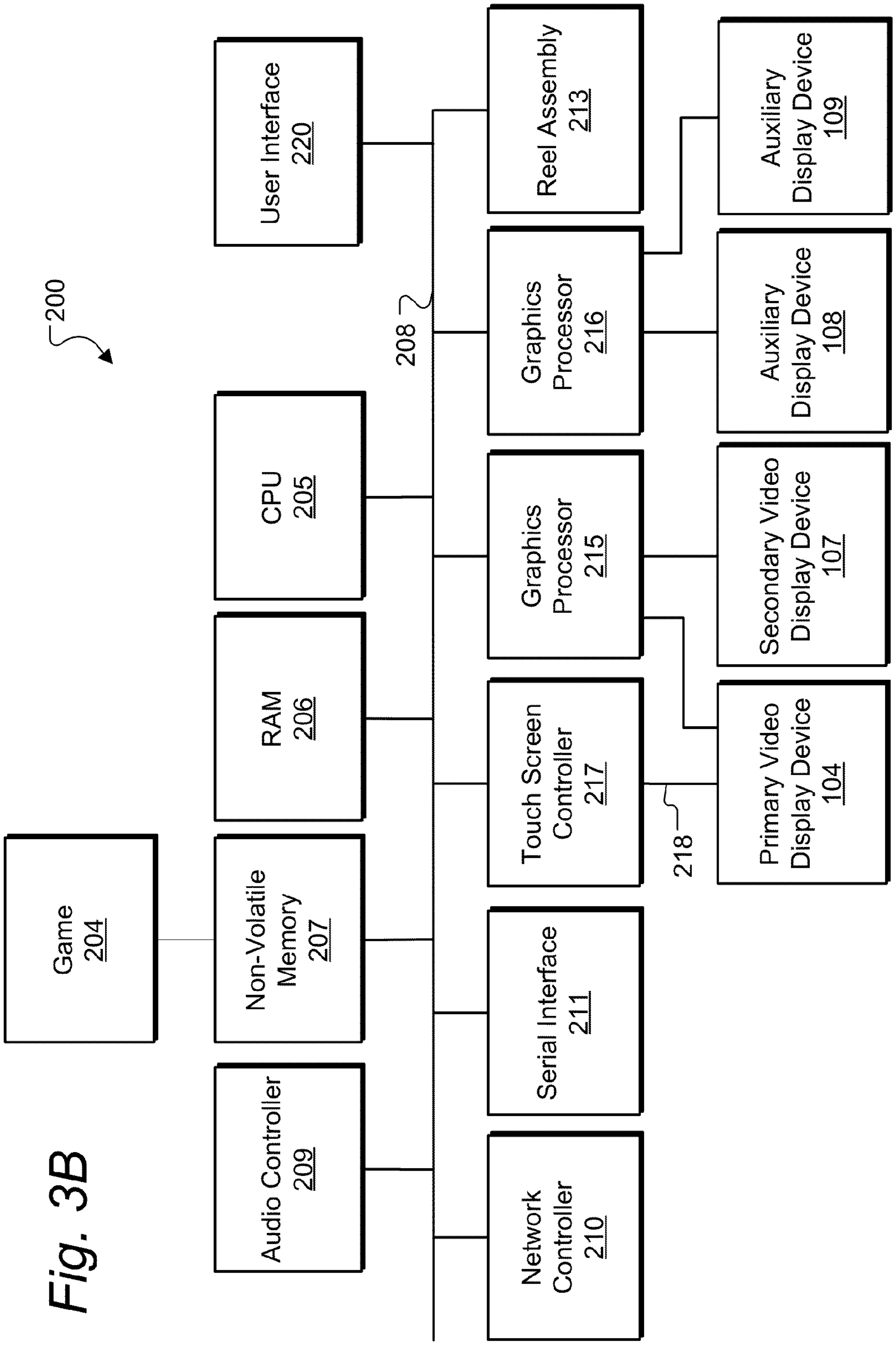
FIG. 3B is a block diagram showing various electronic components of the gaming machine shown in FIG. 3A together with additional gaming system components.

FIG. 3A shows a gaming machine 100 that may be used to implement a Zombie Escape bonus game according to the present invention. The block diagram of FIG. 3B shows further details of gaming machine 100. Referring to FIG. 3A, gaming machine 100 includes a cabinet 101 having a front side generally shown at reference numeral 102. A primary video display device 104 is mounted in a central portion of the front surface 102, with a ledge 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. It should also be noted that each display device referenced herein may include any suitable display device including a cathode ray tube, liquid crystal display, plasma display, LED display, or any other type of display device currently known or that may be developed in the future.

In preferred versions, the gaming machine 100 illustrated in FIG. 3A also includes a number of mechanical control buttons 110 mounted on ledge 106. These control buttons 110 may allow a player to select a bet level, select paylines, select a type of game or game feature, and actually start a play in a primary game. Other forms of gaming machines according to the invention may include switches, joysticks, or other mechanical input devices, and/or virtual buttons and other controls implemented on a suitable touchscreen video display. For example, primary video display device 104 in gaming machine 100 provides a convenient display device for implementing touchscreen controls.

It will be appreciated that gaming machines may also include a number of other player interface devices in addition to devices that are considered player controls for use in playing a particular game. Gaming machine 100 also includes a currency/voucher acceptor having an input ramp 112, a player card reader having a player card input 114, and a voucher/receipt printer having a voucher/receipt output 115. Audio speakers 116 generate an audio output to enhance the user's playing experience. Numerous other types of devices may be included in gaming machines that may be used according to the present invention.

FIG. 3B shows a logical and hardware block diagram 200 of gaming machine 100 which includes a central processing unit (CPU) 205 along with random access memory 206 and nonvolatile memory or storage device 207. All of these devices are connected on a system bus 208 with an audio controller 209, a network controller 210, and a serial interface 211. A graphics processor 215 is also connected on bus 208 and is connected to drive primary video display device 104 and secondary video display device 107 (both mounted on cabinet 101 as shown in FIG. 3A). A second graphics processor 216 is also connected on bus 208 in this example to drive the auxiliary display devices 108 and 109 also shown in FIG. 3A. As shown in FIG. 3B, gaming machine 100 also includes a touch screen controller 217 connected to system bus 208. Touch screen controller 217 is also connected via signal path 218 to receive signals from a touchscreen element associated with primary video display device 104. It will be appreciated that the touchscreen element itself typically comprises a thin film that is secured over the display surface of primary video display device 104. The touchscreen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 3B are elements commonly associated with a personal computer. These elements are preferably mounted on a standard personal computer chassis and housed in a standard personal computer housing which is itself mounted in cabinet 101 shown in FIG. 3A. Alternatively, the various electronic components may be mounted on one or more circuit boards housed within cabinet 101 without a separate enclosure such as those found in personal computers. Those familiar with data processing systems and the various data processing elements shown in FIG. 3B will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 3B as being connected directly on system bus 208 may in fact communicate with the other system components through a suitable expansion bus. Audio controller 209, for example, may be connected to the system via a PCI bus. System bus 208 is shown in FIG. 3B merely to indicate that the various components are connected in some fashion for communication with CPU 205 and is not intended to limit the invention to any particular bus architecture. Numerous other variations in the gaming machine internal structure and system may be used without departing from the principles of the present invention.

It will also be appreciated that graphics processors are also commonly a part of modern computer systems. Although separate graphics processor 215 is shown for controlling primary video display device 104 and secondary video display device 107, and graphics processor 216 is shown for controlling both auxiliary display devices 108 and 109, it will be appreciated that CPU 205 may control all of the display devices directly without any intermediate graphics processor. In some embodiments, the Zombie Escape indicia graphics may be displayed on secondary video display 107 rather than showing the selectable game elements on the primary display. The invention is not limited to any particular arrangement of processing devices for controlling the video display device included with gaming machine 100. Also, a gaming machine implementing the present invention is not limited to any particular number of video display device or other types of display devices.

In the illustrated gaming machine 100, CPU 205 executes software which ultimately controls the entire gaming machine including the receipt of player inputs and the presentation of the graphic symbols displayed according to the invention through the display devices 104, 107, 108, and 109 associated with the gaming machine. As will be discussed further below, CPU 205 either alone or in combination with graphics processor 215 may implement a presentation controller for performing functions associated with a primary game that may be available through the gaming machine, and may also implement a game client for directing one or more display devices at the gaming machine to display portions of an advancing target elimination bonus game according to the present invention. CPU 205 also executes software related to communications handled through network controller 210, and software related to various peripheral devices such as those connected to the system through audio controller 209, serial interface 211, and touch screen controller 217. CPU 205 may also execute software to perform accounting functions associated with game play. Random access memory 206 provides memory for use by CPU 205 in executing its various software programs, while the nonvolatile memory or storage device 207 may comprise a hard drive or other mass storage device providing storage for programs not in use or for other data generated or used in the course of gaming machine operation. Network controller 210 provides an interface to other components of a gaming system in which gaming machine 100 is included. In particular, network controller 210 provides an interface to a game controller which controls certain aspects of the advancing target elimination bonus game.

It should be noted that the invention is not limited to gaming machines employing the personal computer-type arrangement of processing devices and interfaces shown in example gaming machine 100. Other gaming machines through which an advancing target elimination bonus game is implemented may include one or more special purpose processing devices to perform the various processing steps for implementing the present invention. Unlike general purpose processing devices such as CPU 205, these special purpose processing devices may not employ operational program code to direct the various processing steps.

It should also be noted that the invention is not limited to gaming machines including only video display devices for conveying results. It is possible to implement an advancing target elimination bonus game within the scope of the present invention using an electro mechanical arrangement or even a purely mechanical arrangement for displaying the symbols needed to complete the advancing target elimination bonus game as described herein. However, the most preferred forms of the invention utilize one or more video display devices for displaying the spinning reels and the selectable modifier elements. For example, a gaming machine suitable for providing an advancing target elimination bonus game may include a mechanical reel-type display rather than a video-type display device for displaying results in a primary game, and include a video display device for presenting the advancing target elimination bonus game separately.

Still referring to the hardware and logical block diagram 200 showing an example design for a gaming machine 100, the depicted machine in operation is controlled generally by CPU 205 which stores operating programs and data in memory 207 with wagering game 204, user interface 220, network controller 210, audio/visual controllers, and reel assembly 213 (if mechanical reel configuration). CPU or game processor 205 may comprise a conventional microprocessor, such as an Intel Pentium microprocessor, mounted on a printed circuit board with supporting ports, drivers, memory, software, and firmware to communicate with and control gaming machine operations, such as through the execution of coding stored in memory 207 including one or more wagering games 204. Game processor 205 connects to user interface 220 such that a player may enter input information, and game processor 205 may respond according to its programming, such as to apply a wager and initiate execution of a game.

Figure 4A:
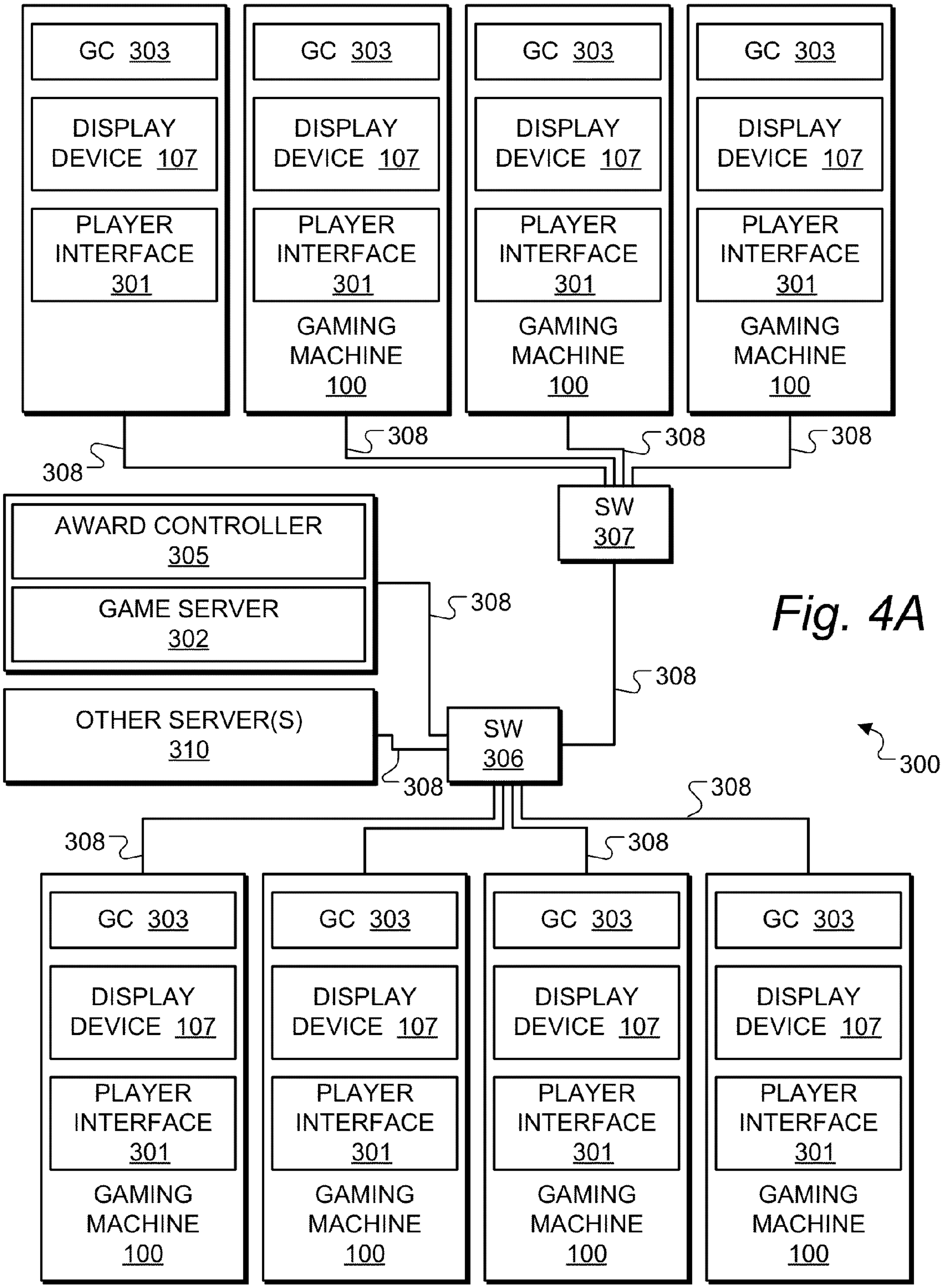
FIG. 4A is a system block diagram of a gaming system according to one embodiment of the present invention.
Figure 4B:
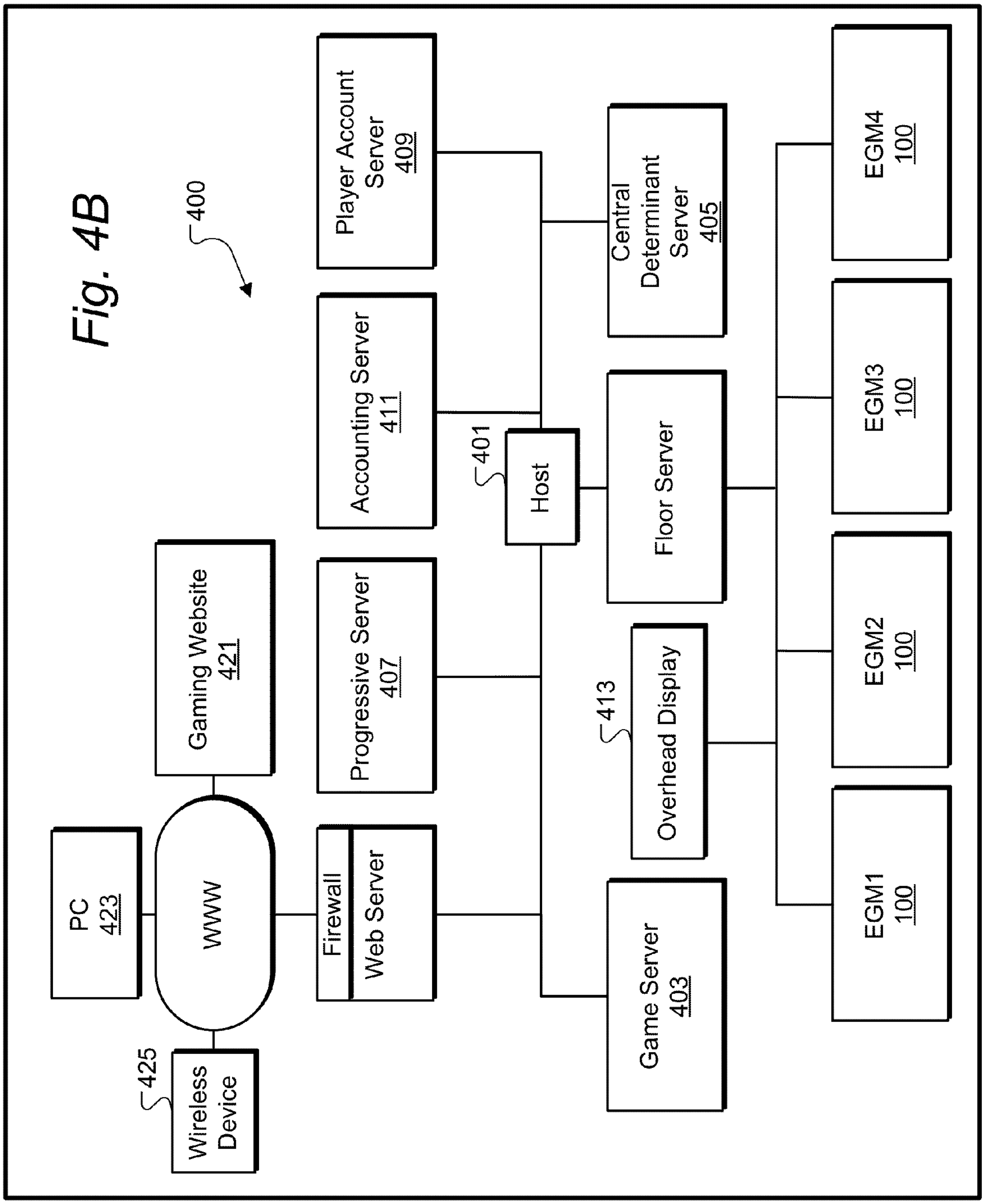
FIG. 4B is a system block diagram of a gaming system according to another embodiment.

Game processor 205 also may connect through network controller 210 to a gaming network, such as example casino server network 400 shown in FIG. 4B. Referring now to FIG. 4B, the casino server network 400 may be implemented over one or more site locations and include host server 401, remote game play server 403 (which may be configured to provide game processor functionality including determining game outcomes and providing audio/visual instructions to a remote gaming device), central determinant server 405 (which may be configured to determine lottery, bingo, or other centrally determined game outcomes and provide the information to networked gaming machines 100 providing lottery and bingo-based wagering games to patrons), progressive server 407 (which may be configured to accumulate a progressive pool from a portion of wagering proceeds or operator marketing funds and to award progressive awards upon the occurrence of a progressive award winning event to one or more networked gaming machines 100), player account server 409 (which may be configured to collect and store player information and/or awards and to provide player information to gaming machines 100 after receiving player identification information such as from a player card), and accounting server 411 (which may be configured to receive and store data from networked gaming machines 100 and to use the data to provide reports and analyses to an operator). Through its network connection, gaming machine 100 may be monitored by an operator through one or more servers such as to assure proper operation, and, data and information may be shared between gaming machine 100 and respective of the servers in the network such as to accumulate or provide player promotional value, to provide server-based games, or to pay server-based awards.

Referring now to FIG. 4A, a gaming system 300 according to another embodiment of the present invention is shown again in a network and system diagram format. System 300 includes a number of gaming machines, each comprising a gaming machine 100 in this example implementation. For purposes of describing system 300, each gaming machine 100 in FIG. 4A is shown as including a video display device 107 and a player interface that may include buttons, switches, or other physical controls and/or touchscreen controls as discussed above in connection with FIG. 4A. This player interface is labeled 301 in FIG. 4A. System 300 further includes a game server 302 and a respective game client 303 (abbreviated "GC" in FIG. 4A) included with each respective gaming machine 100. In the form of the invention shown in FIG. 4A, these two components, game server 302 and the game client components 303, combine to implement a game control arrangement which will be described in detail below. System 300 also includes an award controller 305, which is shown in FIG. 4A as being associated with game server 302 to indicate that the two components may be implemented through a common data processing device/computer system. Gaming machines 100, game server 302, and award controller 305 are connected in a network communication arrangement including first and second network switches 306 and 307, connected together through various wired or wireless signal paths, all shown as communications links 308 in FIG. 4A.

Each gaming machine 100, and particularly player interface 301 associated with each gaming machine, allows a player to make any inputs that may be required to make the respective gaming machine eligible for an advancing target elimination bonus game, and make selections of any selectable objects displayed at the respective gaming machine in the course of the advancing target elimination bonus game. Player interface 301 also allows a player at the gaming machine to initiate plays in a primary game available through the gaming machine in some implementations. The respective video display device 107 associated with each respective gaming machine 100 is used according to the invention to generate the graphic displays to show the various elements of an advancing target elimination bonus game at the respective gaming machine.

The game control arrangement made up of game server 302 and the respective game client 303 at a given gaming machine functions to control the respective video display device 107 for that gaming machine to display a number of selectable modifier objects. Award controller 305 is responsible for awarding prizes for a player's participation in an advancing target elimination bonus game, and maintaining progressive prize information where the advancing target elimination bonus game offers one or more progressive prizes. The network arrangement made up of network switches 306 and 307, and the various communication links 308 shown in FIG. 4A is illustrated merely as an example of a suitable communications arrangement. It should be noted that the game control arrangement, or as it is referred to generally the "game controller," may be implemented in some embodiments entirely on the gaming machine. This is especially true in jurisdictions that allow Class III gaming conducted with random number generators at each gaming machine. The present invention is not limited to any particular communications arrangement for facilitating communications between game server 302 and various gaming machines 100. Any wired or wireless communication arrangement employing any suitable communications protocols (such as TCP/IP for example) may be used in an apparatus according to the invention.

FIG. 4A shows other server(s) 310 included in the network. This illustrated "other server(s)" element 310 may include one or more data processing devices for performing various functions related to games conducted through system 300 and any other games that may be available to players through gaming machines 100. For example, apparatus 300 may be accounting servers providing support for cashless gaming or various forms of mixed cash/cashless gaming through the various gaming machines 100. In this example, an additional one of the other servers 310 will be included in apparatus 300 for supporting these types of wagering and payout systems. As another example, the various gaming machines 100 included in system 300 may allow players to participate in a game (primary game) other than the advancing target elimination bonus game described herein, and this other game may rely on a result identified at or in cooperation with a device that is remote from the gaming machines. In this example, another server 310 may be included in the system for identifying results for the primary game and communicating those results to the various gaming machines 100 as necessary. Generally, the other server(s) 310 shown in FIG. 4A are shown only to indicate that numerous other components may be included along with the elements that participate in providing advancing target elimination bonus games according to the present invention. Other server(s) 310 may provide record keeping, player tracking, accounting, result identifying services, or any other services that may be useful or necessary in a gaming system.

Referring to FIG. 4B, a block diagram of another example networked gaming system 400 associated with one or more gaming facilities is shown, including one or more networked gaming machines 100 in accordance with one or more embodiments. With reference to FIG. 4B, while a few servers have been shown separately, they may be combined or split into additional servers having additional capabilities.

As shown, networked gaming machines 100 (EGM1-EGM4) and one or more overhead displays 413 may be network connected and enable the content of one or more displays of gaming machines 100 to be mirrored or replayed on an overhead display. For example, the primary display content may be stored by the display controller or game processor 205 and transmitted through network controller 210 to the overhead display controller either substantially simultaneously or at a subsequent time according to either periodic programming executed by game processor 205 or a triggering event, such as a jackpot or large win, at a respective gaming machine 100. In the event that gaming machines 100 have cameras installed, the respective player's video images may be displayed on overhead display 413 along with the content of the player's display 100 and any associated audio feed.

In one or more embodiments, game server 403 may provide server-based games and/or game services to network connected gaming devices, such as gaming machines 100 (which may be connected by network cable or wirelessly). Progressive server 407 may accumulate progressive awards by receiving defined amounts (such as a percentage of the wagers from eligible gaming devices or by receiving funding from marketing or casino funds) and provide progressive awards to winning gaming devices upon a progressive event, such as a progressive jackpot game outcome or other triggering event such as a random or pseudo-random win determination at a networked gaming device or server (such as to provide a large potential award to players playing the community feature game). Accounting server 411 may receive gaming data from each of the networked gaming devices, perform audit functions, and provide data for analysis programs, such as the IGT Mariposa program bundle.

Player account server 409 may maintain player account records, and store persistent player data such as accumulated player points and/or player preferences (e.g. game personalizing selections or options). For example, the player tracking display may be programmed to display a player menu that may include a choice of personalized gaming selections that may be applied to a gaming machine 100 being played by the player.

In one or more embodiments, the player menu may be programmed to display after a player inserts a player card into the card reader. When the card reader is inserted, an identification may be read from the card and transmitted to player account server 409. Player account server 409 transmits player information through network controller 210 to user interface 220 for display on the player tracking display. The player tracking display may provide a personalized welcome to the player, the player's current player points, and any additional personalized data. If the player has not previously made a selection, then this information may or may not be displayed. Once the player makes a personalizing selection, the information may be transmitted to game processor 205 for storing and use during the player's game play. Also, the player's selection may be transmitted to player account server 409 where it may be stored in association with the player's account for transmission to the player in future gaming sessions. The player may change selections at any time using the player tracking display (which may be touch sensitive or have player-selectable buttons associated with the various display selections).

In one or more embodiments, a gaming website may be accessible by players, e.g. gaming website 421, whereon one or more games may be displayed as described herein and played by a player such as through the use of personal computer 423 or handheld wireless device 425 (e.g. Blackberry cell phone, Apple iPhone, personal data assistant (PDA), iPad, etc.). To enter the website, a player may log in with a username (that may be associated with the player's account information stored on player account server 409 or be accessible by a casino operator to obtain player data and provide promotional offers), play various games on the website, make various personalizing selections and save the information, so that during a next gaming session at a casino establishment, the player's playing data and personalized information may be associated with the player's account and accessible at the player's selected gaming machine 100.

Referring generally to the description herein, any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

Further, as described herein, the various features have been provided in the context of various described embodiments, but may be used in other embodiments. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method of operating a wagering game with a moving target elimination feature under the control of at least one processor and provided through an electronic gaming machine, the method comprising:

a) receiving a player input or authorization of money or wagering credits having a money value through a currency/voucher acceptor or a player card reader connected to the gaming machine, and causing the at least one processor to execute program code to initiate play of the wagering game after receiving a wager input from a player;

b) causing the at least one processor to execute program code to display multiple targets on an electronic display at the gaming machine, and providing the player ability to make selections from a set of player selectable indicia displayed on the electronic display separate from the targets, the indicia having a potential effect on the targets;

c) causing the at least one processor to execute program code to, depending upon each indicia selection, eliminate zero or more of the multiple targets and provide a player with an award related to any targets eliminated;

d) causing the at least one processor to execute program code to, after each selection and elimination, move one or more remaining of the targets on the display towards an objective;

e) causing the at least one processor to execute program code to, after designated selections, add additional targets to the display;

f) causing the at least one processor to execute program code to, if all targets are eliminated, providing the player with a bonus award and ending the game; and g) causing the at least one processor to initiate transfer of credits having a cash value to a player responsive to awarding the prize, and allowing the player to withdraw cash corresponding to the cash value.

2. The method of claim 1, in which moving one or more targets includes moving them in a direction from an origin toward the objective, and in which adding one or more targets is done by displaying the additional targets moving from, or appearing adjacent to, the origin.

3. The method of claim 2, in which the origin and objective are separated by multiple discrete rows, and in which moving one or more targets further includes advancing them one row toward the objective.

4. The method of claim 1 including the step of ending the game, if one or more targets advance to reach the objective.

5. The method of claim 1 in which the multiple targets include at least two types of targets, including a first type that can be eliminated in a single player selection and a second type that can only be eliminated through multiple player selections.

6. The method of claim 5 in which the second type of target provides a greater award than the first type when eliminated.

7. The method of claim 1 in which the selectable indicia conceal several types of game elements that are respectively activated upon player selection to eliminate different numbers of targets.

8. The method of claim 7 in which the selectable indicia conceal game elements that represent differing types of weapons, and the multiple targets are graphics of zombie characters.

9. The method of claim 1 in which the designated selections are determined by adding additional targets to the display from the beginning of the game until a designated number of selections, after which no more targets are added, and further comprising displaying the designated number of selections to the player to inform them of when new targets will stop being added.

10. The method of claim 9 further comprising continuing the game after the designated number of selections with no new targets added after each selection.

11. A wagering game with a moving target elimination feature operated under the control of at least one processor and provided through an electronic gaming machine, the wagering game including the steps of:

a) receiving a player input or authorization of money or wagering credits having a money value through a currency/voucher acceptor or a player card reader, and initiating play of the wagering game after receiving a wager from a player;

b) providing the player ability to make selections from a set of player selectable indicia on a gaming display, each having designated different effect on one or more targets;

c) depending upon each indicia selection, eliminating zero, one or multiple targets on the gaming display and providing a player with an award related to any targets eliminated;

d) after each indicia selection and target elimination, moving one or more remaining of the targets toward an objective;

e) if all targets are eliminated, providing the player with a bonus award of wagering credits having a money value and ending the game;

f) allowing the player to withdraw money corresponding to the money value of the wagering credits of the bonus award.

12. The wagering game of claim 11, further comprising adding one or more targets after each selection for a designated number of selections.

13. The wagering game of claim 12, in which moving one or more targets includes moving them in a direction from an origin toward an objective, and in which adding one or more targets is done by moving from, or appearing at, the origin.

14. The wagering game of claim 13, in which the origin and objective are separated by multiple discrete ranks or rows, and in which moving one or more targets further includes advancing them one row toward the objective.

15. The wagering game of claim 11 including the step of ending the game if one or more targets advance to reach an objective.

16. A gaming machine configured to operate a wagering game providing a moving target elimination feature under control of a processor, including:

(a) a display system including a moving target display area and a separate selectable indicia display area;

(b) a player input system including wagering buttons positioned on a ledge at a front side of the gaming machine, and a currency or voucher acceptor or a player card reader configured to accept a cash or credit input from a player; and (c) at least one memory device storing instructions executable by the at least one processor to:

execute program code to initiate play of the wagering game after receiving a wager input from a player;

execute program code to display multiple targets on an electronic display at the gaming machine, and providing the player ability to make selections from a set of player selectable indicia displayed on the electronic display;

execute program code to, depending upon each selection, eliminate zero or more of the multiple targets and provide a player with an award related to any targets eliminated;

execute program code to, after each selection, move one or more remaining of the targets on the display towards an objective;

to execute program code to, after designated selections, add additional targets to the display;

execute program code to, if all targets are eliminated, providing the player with a bonus award and ending the game; and execute program code to initiate transfer of credits having a cash value to a player responsive to awarding the prize, and allowing the player to withdraw cash corresponding to the cash value.

17. The gaming machine of claim 16 in which the multiple targets include at least two types of targets, including a first type that can be eliminated in a single player selection and a second type that can only be eliminated through multiple player selections.

18. The gaming machine of claim 16 in which the selectable indicia conceal several types of game elements that are respectively activated upon player selection to eliminate different numbers of targets.

19. The gaming machine of claim 16, in which moving one or more targets includes moving them in a direction from an origin toward the objective, and in which adding one or more targets is done by displaying the additional targets moving from, or appearing adjacent to, the origin.

* * * * *